(12) United States Patent
Zhao et al.

(10) Patent No.: US 9,320,028 B2
(45) Date of Patent: *Apr. 19, 2016

(54) METHOD, BASE STATION, AND USER TERMINAL FOR IMPLEMENTING UPLINK RESOURCE INDICATION

(71) Applicant: HUAWEI TECHNOLOGIES CO.,LTD., Shenzhen, Guangdong (CN)

(72) Inventors: Meng Zhao, Shenzhen (CN); Yongxia Lv, Beijing (CN); Xiaobo Chen, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/159,245

(22) Filed: Jan. 20, 2014

(65) Prior Publication Data

US 2014/0133442 A1    May 15, 2014

Related U.S. Application Data

(63) Continuation of application No. 13/105,555, filed on May 11, 2011, now abandoned, which is a continuation of application No. 12/504,239, filed on Jul. 16, 2009, now Pat. No. 8,358,603, which is a continuation of application No. PCT/CN2008/071926, filed on Aug. 7, 2008.

(30) Foreign Application Priority Data

Aug. 9, 2007 (CN) .......................... 2007 1 0140544

(51) Int. Cl.
*H04B 7/00* (2006.01)
*H04W 72/04* (2009.01)

(52) U.S. Cl.
CPC ................... *H04W 72/0413* (2013.01)

(58) Field of Classification Search
CPC .............................. H04W 76/02; H04W 76/22
USPC ................... 370/310, 328, 329, 345, 348, 349
See application file for complete search history.

(56) References Cited

U.S. PATENT DOCUMENTS

| 5,598,417 A | 1/1997 | Crisler et al. |
| 6,801,517 B2 | 10/2004 | Dick et al. |

(Continued)

FOREIGN PATENT DOCUMENTS

| CN | 1219306 A | 6/1999 |
| CN | 1524367 A | 8/2004 |

(Continued)

OTHER PUBLICATIONS

3GPP TS 36.213 V1.2.0; 3rd Generation Partnership Project; Technical Specification Group Radio Access Network; Physical layer procedures; (Release 8); May 2007; total 10 pages.

(Continued)

*Primary Examiner* — Dmitry H Levitan
(74) *Attorney, Agent, or Firm* — Futurewei Technologies, Inc.

(57) ABSTRACT

A method, a base station (BS), and a user terminal are provided for implementing uplink resource indication. The method includes carrying an uplink resource index in an uplink resource grant (UL Grant), in which an uplink resource index corresponds to at least one uplink resource in terms of indication; and sending the UL Grant. The BS includes an index carrying module and an instruction sending module. The user terminal includes an instruction receiving module, an instruction resolving module, and an execution module.

19 Claims, 8 Drawing Sheets

(56) References Cited

U.S. PATENT DOCUMENTS

| | | | |
|---|---|---|---|
| 7,146,172 B2 | 12/2006 | Li et al. | |
| 7,724,773 B2 | 5/2010 | Zhang et al. | |
| 7,817,613 B2 | 10/2010 | Anderson | |
| 7,912,135 B2 | 3/2011 | Kwak et al. | |
| 8,000,272 B2 * | 8/2011 | Gao et al. | 370/280 |
| 8,102,802 B2 | 1/2012 | Ratasuk et al. | |
| 2005/0078630 A1 | 4/2005 | Choi | |
| 2005/0259629 A1 | 11/2005 | Oliver et al. | |
| 2007/0009054 A1 | 1/2007 | Kwak et al. | |
| 2007/0258404 A1 | 11/2007 | Tirkkonen et al. | |
| 2008/0049670 A1 | 2/2008 | Cho et al. | |
| 2008/0232240 A1 | 9/2008 | Baum et al. | |
| 2009/0046605 A1 | 2/2009 | Gao et al. | |
| 2009/0175233 A1 | 7/2009 | Ojala et al. | |
| 2009/0196240 A1 | 8/2009 | Frederiksen et al. | |
| 2010/0142461 A1 | 6/2010 | Miki et al. | |
| 2010/0177669 A1 | 7/2010 | Suo et al. | |

FOREIGN PATENT DOCUMENTS

| | | | |
|---|---|---|---|
| CN | 1536793 A | 10/2004 | |
| CN | 1606363 A | 4/2005 | |
| CN | 1889759 A | 1/2007 | |
| CN | 1917706 A | 2/2007 | |
| CN | 1972496 A | 5/2007 | |
| CN | 101087170 A | 12/2007 | |
| EP | 1796410 A1 | 6/2007 | |
| WO | 9837706 A2 | 8/1998 | |
| WO | 0249385 A2 | 6/2002 | |
| WO | 2006075042 A1 | 7/2006 | |
| WO | 2006137708 A1 | 12/2006 | |
| WO | 2008041819 A2 | 4/2008 | |
| WO | 2009022314 A2 | 2/2009 | |

OTHER PUBLICATIONS

3GPP TS 36.212 V1.3.0; 3rd Generation Partnership Project; Technical Specification Group Radio Access Network; Multiplexing and channel coding; (Release 8); Jul. 2007; total 20 pages.

Ericsson; R1-071890; TSG-RAN WG1 LTE TDD Ad Hoc; Allocation of subframes to UL and DL; Agenda Item:3.1; Beijing, China, Apr. 17-20, 2007; total 3 pages.

3GPP TS 36.211 V1.0.0; 3rd Generation Partnership Project; Technical Specification Group Radio Access Network; Physical Channels and Modulation; (Release 8); Mar. 2007; total 30 pages.

Nokia, Nokia Siemens Networks; 3GPP TSG RAN WG1 Meeting #51bis; R1-080306; Way forward for LTE TDD Uplink Multi-TTI Scheduling; Agenda item: 6.1.3; Sevilla, Spain; Jan. 14-18, 2008; total 4 pages.

NEC Group; TSG-RAN WG1#49bis; R1-072832; DL Unicast Resource Allocation Signalling using L1L2 control channels; Agenda item: 5.13.1; Orlando, USA; Jun. 25-29, 2007; total 6 pages.

Mitsubishi Electric; 3GPP TSG RAN WG1#49; R1-072060; Scheduling Policy and Signaling Way on DL Resource Allocation; Agenda item: 7.13.1; Kobe, Japan; May 7-11, 2007; total 4 pages.

CATT, ZTE; 3GPP TSG RAN WG1 Meeting #49bis; R1-072931; Timing relationship between the DL control signaling and associated sub-frames; Agenda item: 5.13.1; Orlando, FL USA; Jun. 25-29, 2007; total 2 pages.

LG Electronics; 3GPP TSG RAN WG1 LTE TDD Ad Hoc; R1-071848; Overall control signaling structure for generic LTE TDD; Agenda item: 3.13; Beijing, China; Apr. 17-20, 2007; total 4 pages.

Nokia, Nokia Siemens Networks; R1-072998; 3GPP TSG RAN WG1 Meeting#49bis; Control signaling considerations for EUTRA TDD; Agenda item: 5.13.1; Orlando, USA; Jun. 25-29. 2007; total 2 pages.

* cited by examiner

METHOD, BASE STATION, AND USER TERMINAL FOR IMPLEMENTING UPLINK RESOURCE INDICATION

CROSS-REFERENCE TO RELATED APPLICATIONS

This application is a continuation of U.S. patent application Ser. No. 13/105,555, filed on 11 May 2011, which is a continuation of U.S. patent application Ser. No. 12/504,239, filed on Jul. 16, 2009, which is a continuation of International Application No. PCT/CN2008/071926, filed on Aug. 7, 2008. The International Application claims priority to Chinese Patent Application No. 200710140544.8, filed on Aug. 9, 2007. All of the afore-mentioned patent applications are hereby incorporated by reference in their entireties.

FIELD OF THE DISCLOSURE

The present disclosure relates to the field of communications, and more particularly to a method, a base station (BS), and a user terminal for implementing uplink resource indication.

BACKGROUND OF THE DISCLOSURE

Time Division Duplex (TDD) is a radio transmission mode on radio channels. In the TDD mode, the transmission and reception are conducted in a time division manner, that is, the radio transmission based on the TDD mode realizes the time division multiplexing of uplink and downlink channels. The TDD mode is implemented by repeating Time Division Multiple Access (TDMA) frame structures periodically in time domains. For example, in Long Term Evolution (LTE), the 3GPP LTE has two TDD frame structures. The first frame structure is as shown in FIG. 1, in which a radio frame is composed by 20 slots, a period of a frame is 10 ms, and every two slots form a subframe (SF). The second frame structure is as shown in FIG. 2, in which a period of a frame is also 10 ms, a frame is divided into two half-frames, each half-frame is composed by seven SFs, a guard interval is inserted between every two SFs, and a guard period (GP) is formed by a downlink pilot time slot (DwPTS), a GP, and an uplink pilot time slot (UpPTS).

In the frame structure in the TDD mode, one frame includes several SFs or slots. The SFs may be classified into uplink SFs and downlink SFs, and a TDD system may use a transfer point to change the SF types flexibly. For example, the current 3GPP LTE standard specifies various SF ratios in the two frame structures. FIG. 3 is a schematic view of various uplink and downlink SF ratios in the first frame structure, in which the ratios in one frame are illustrated. FIG. 4 is a schematic view of various uplink and downlink SF ratios in the second frame structure, in which the ratios in one and a half frames are illustrated. A table of uplink and downlink SF ratios (as shown in Table 1) can be concluded from FIGS. 3 and 4. Table 1 lists the situation of one transfer point, that is, the situation that the uplink and downlink SFs have only one type transfer.

TABLE 1

| Frame Structure | Uplink and Downlink SF Ratios (Downlink:Uplink) |
| --- | --- |
| First Frame Structure | 4:1, 3:2, 9:1, 6:4, 7:3, 8:2, 10:0, 2:2, 4:2, 2:3, 1:4 |
| Second Frame Structure | 6:1, 5:2, 4:3, 3:4, 2:5, 1:6 |

According to different service requirements, the TDD system needs to indicate the uplink resources to which some uplink instructions are directed in the uplink instructions. For example, in downlink transmission of a 3GPP Evolved Universal Terrestrial Radio Access (E-UTRA) system, an Orthogonal Frequency Division Multiplexing (OFDM) technology is employed to realize multiple access. The OFDM is a multi-carrier communication technology. In a multi-carrier communication system, different time domain and frequency domain resources are granted to different users to realize multiplexing of time-frequency resources by multiple users. Here, the time-frequency resources may be granted by carrying resource grant indications of corresponding uplink SFs (UL Grant) in downlink control signaling of a user. A UL Grant may contain different contents. Table 2 lists the content of a UL Grant.

TABLE 2

| | 5 MHz UL | |
| --- | --- | --- |
| Domain | Occupied Bits | Content |
| Resource Grant | 9 | Continuous physical resource blocks granted to a user |
| Transmission Format Indication/ Transmission Block Size + Modulation Code Format | 7 | Transmission format indication, modulation and information bits number and code formats |
| Hybrid Automatic Retransmission Request (HARQ) | 2 | Synchronous HARQ: 2-3 bits of serial number and implicit confirmation of previous transmission blocks |
| Power Control | 2 | Relative instructions |
| Pilot Instruction | 1 | Whether the pilot appears in the last long block (from other user terminals) or whether the last long block is configured to transmit data |
| Channel Quality Indication | 1 | The quality indication report about the channel scheduling should be included in the data |
| ACK/NACK Indication | 1 | Indicating that the user terminal should reserve resources for ACK/NACK on the physical uplink synchronous channel |
| Multi-antenna Technology | 2 | Determined by multi-user MIMO and uplink multi-antenna technology, 2 bits |
| User Terminal Identity + Cyclic Redundancy Check (CRC) | 20 | 16-24-bit CRC |

Generally, a base station (BS) adopts downlink SFs to send the UL Grant as shown in Table 2. After receiving the ul grant, each user determines whether the user identity in the UL Grant is consistent with the identity of each user itself; and if they are consistent, the user grants the resources according to the UL Grant. Thus, the resources can be granted to all users. For a user, when the downlink SFs are more than the uplink SFs, each of the downlink SFs is mapped to one uplink SF, that is, the downlink SF may be configured to send a UL Grant for one uplink SF. However, the frame structure in the TDD system may be asymmetrical in terms of the uplink and downlink ratio, as shown in Table 1, that is, one downlink SF may be corresponding to multiple uplink SFs, so that the corresponding uplink SF cannot be determined according to one UL Grant. In this case, a downlink SF needs to be configured to send multiple UL Grants, so that one downlink SF is corresponding to multiple uplink SFs, and the UL Grants will be sent separately. In other words, for the same user, if it is determined that n uplink SFs are required after scheduling, n corresponding UL Grants exist, which will be transmitted repeatedly. Thus, the information such as the user identity is also repeatedly transmitted for n times, resulting in the waste of transmission resources such as signaling and channels.

It is known from the above analysis that the existing method for implementing uplink resource indication in the TDD system cannot indicate the uplink resources corresponding to the UL Grants precisely, which may cause the waste of the resources and lead to a low utilization of the resources.

SUMMARY

Accordingly, the present invention provides a method, a base station (BS), and a user terminal for implementing uplink resource indication.

A method for implementing uplink resource indication includes:

An uplink resource index is carried in a UL Grant, in which the uplink resource index corresponds to at least one uplink resource in terms of indication.

The UL Grant is sent.

A BS for implementing uplink resource indication includes an index carrying module and an instruction sending module.

The index carrying module is configured to carry an uplink resource index in a UL Grant, in which the uplink resource index corresponds to at least one uplink resource in terms of indication.

The instruction sending module is configured to send the UL Grant.

A user terminal for implementing uplink resource indication includes an instruction receiving module, an instructing resolving module, and an execution module.

The instruction receiving module is configured to receive a UL Grant from a BS, in which the UL Grant carries an uplink resource index, and the uplink resource index corresponds to at least one uplink resource in terms of indication.

The instruction resolving module is configured to resolve the uplink resource index from the UL Grant received by the instruction receiving module.

The execution module is configured to obtain the at least one uplink resource corresponding to the uplink resource index resolved by the instruction resolving module according to a corresponding relation between the uplink resource index and the at least one uplink resource obtained in advance, and perform the resource grant on the obtained at least one uplink resource.

It is known from the above technical solutions that the method, BS, and user terminal for implementing uplink resource indication according to the embodiments of the present invention realize accurate indication of the at least one uplink resource through the uplink resource index, prevent repeated transmission of the same information in multiple uplink resources, effectively reduce the signaling overhead, and increase the resource utilization.

BRIEF DESCRIPTION OF THE DRAWINGS

The present invention will become better understood from the detailed description given herein below for illustration only, and thus are not limitative of the present invention, and wherein.

DETAILED DESCRIPTION OF THE EMBODIMENTS

In order to make the objectives, technical solutions, and beneficial effects of the present invention comprehensible, embodiments of the present invention are described in detail below with reference to the accompanying drawings.

A method according to an embodiment of the present invention includes the following steps. An uplink resource index is carried in a UL Grant, in which the uplink resource index is corresponding to at least one uplink resource in terms of indication. Then, the UL Grant is sent.

In the embodiment of the present invention, the uplink resource may be a time domain resource such as an uplink slot or an uplink SF, or other resource blocks such as a frequency domain resource block. The uplink SF is taken as an example below to illustrate the present invention.

Figure 5:
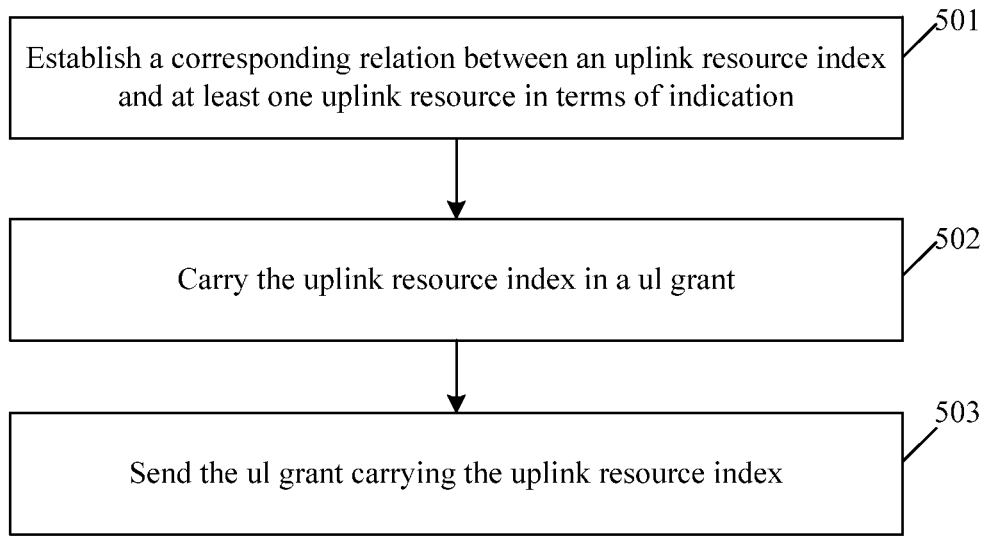
FIG. 5 is a schematic flow chart of a method for implementing uplink resource indication according to a first embodiment of the present invention.

FIG. 5 is a schematic flow chart of a method for implementing uplink resource indication according to a first embodiment of the present invention.

In Step 501, a corresponding relation between an uplink resource index and at least one uplink resource in terms of indication is established.

The method for establishing the corresponding relation between the uplink resource index and the at least one uplink resource in terms of indication includes the following steps. The at least one uplink resource is combined into one group, and the uplink resources in each group are not completely the same. Each group is corresponding to an uplink resource index, so as to establish the corresponding relation between the uplink resource index and the at least one uplink resource in terms of indication.

In this embodiment, uplink resource indexes of different bits are applied to different frame structures, so that different corresponding relations between the uplink resource index and at least one uplink SF can be established. The establishing the corresponding relation between the uplink resource index and the at least one uplink SF in terms of indication in different circumstances is described in detail below. Persons skilled in the art should understand that only some specific examples of the technical solutions according to the embodiments of the present invention are illustrated below, and the present invention is not limited thereto.

Figure 2:
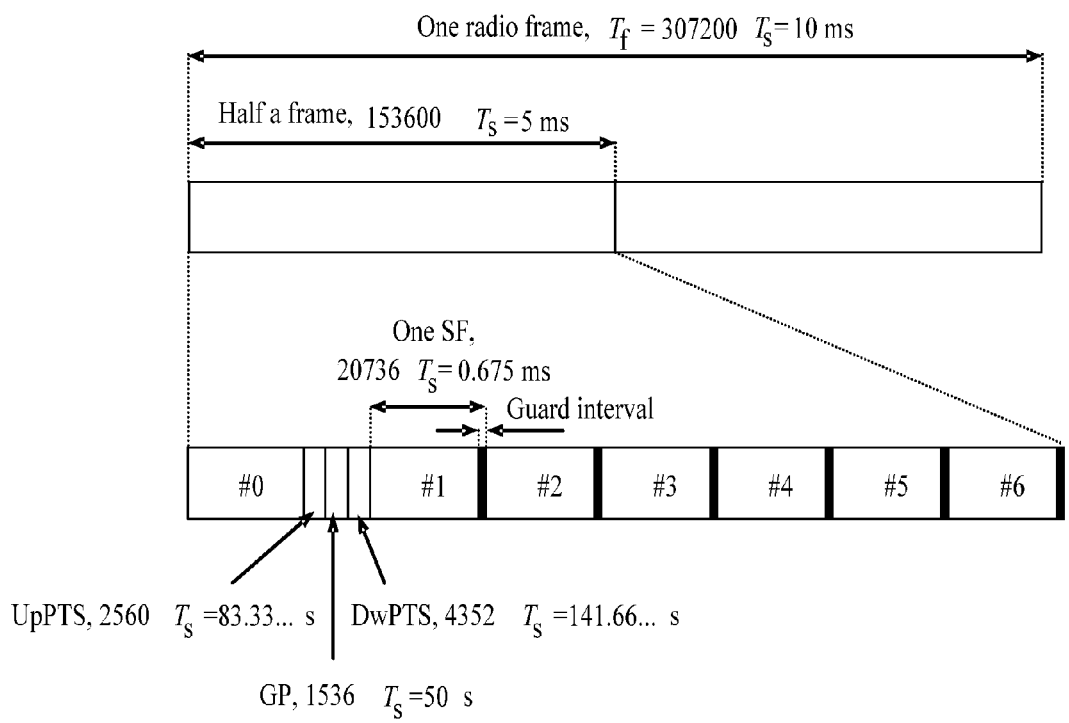
FIG. 2 is a schematic view of a second frame structure in the prior art.
Figure 3:
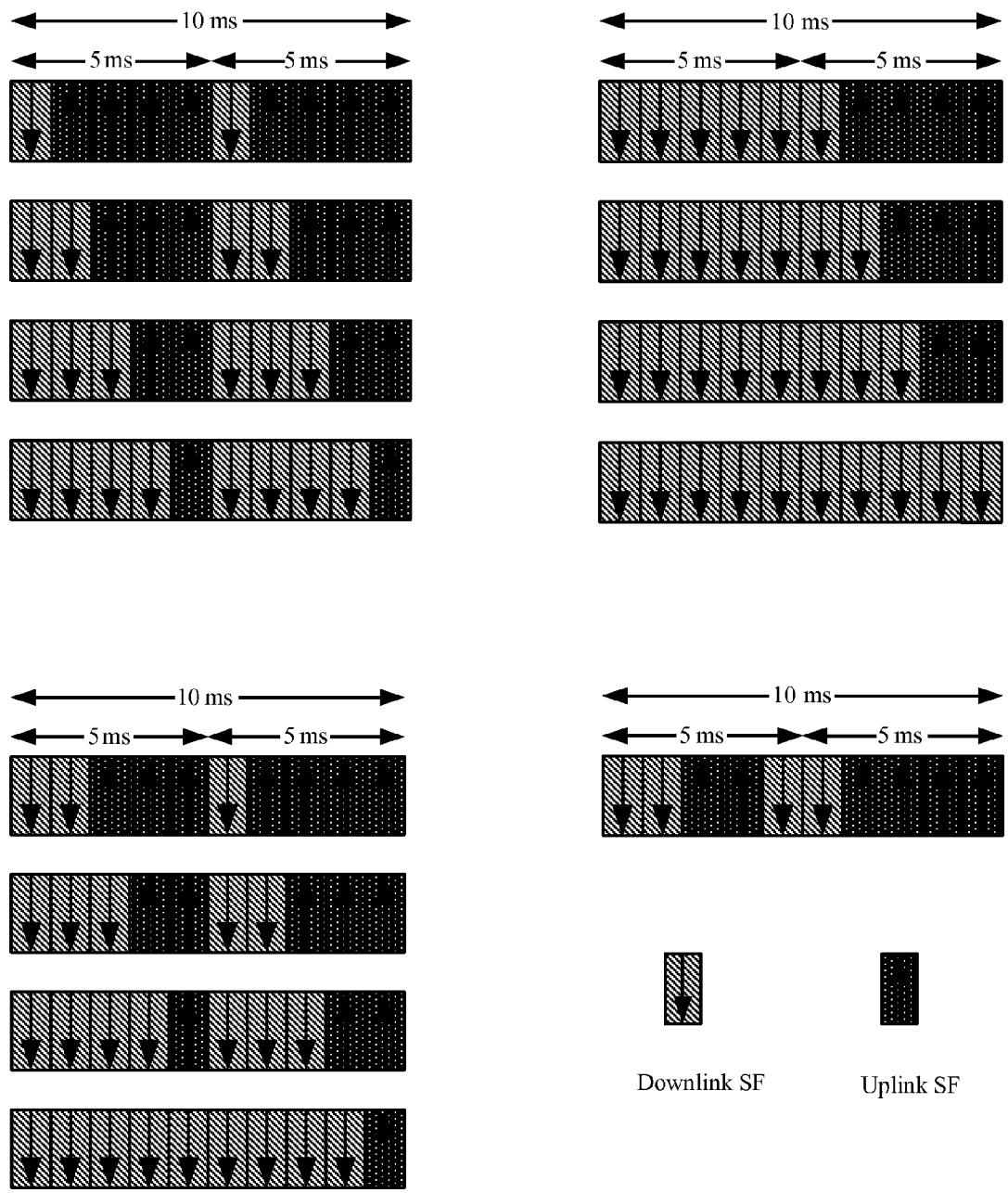
FIG. 3 is a schematic view of various uplink and downlink RF ratios in the first frame structure in the prior art.
Figure 4:
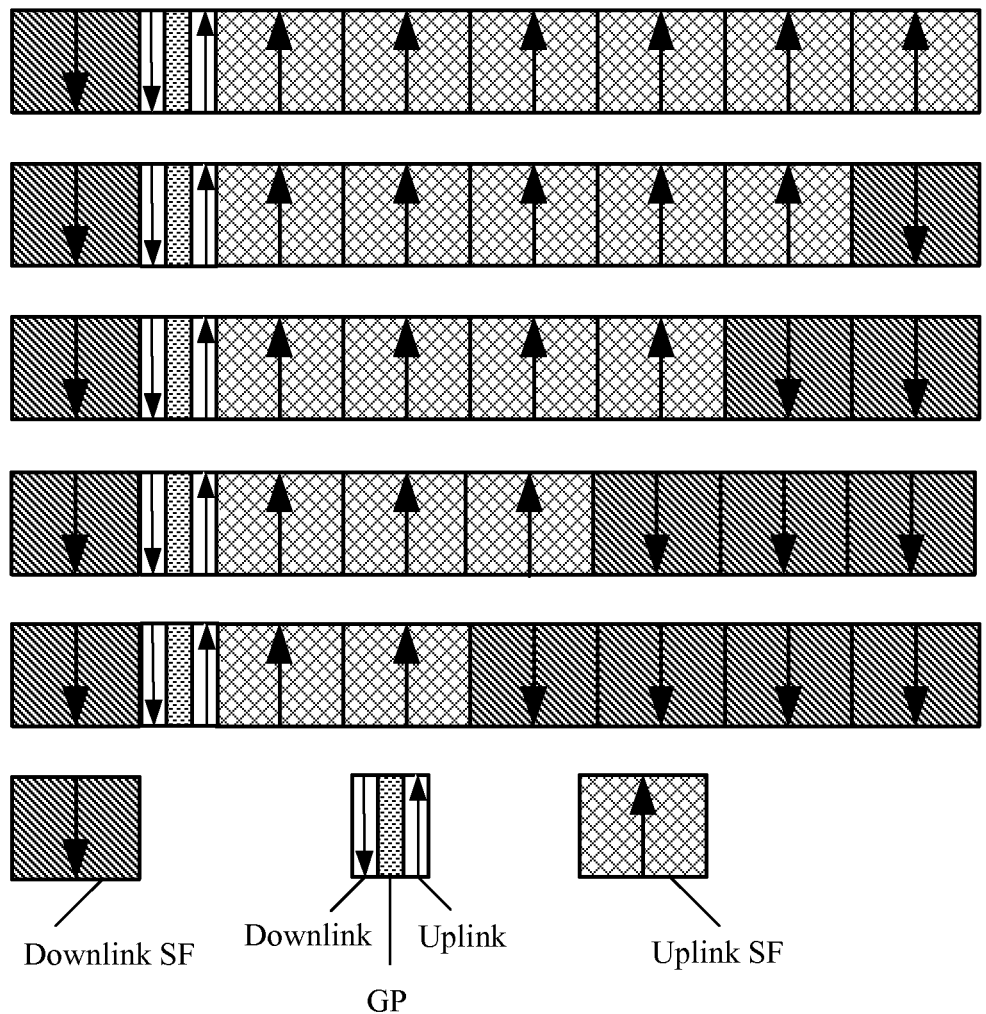
FIG. 4 is a schematic view of various uplink and downlink RF ratios in the second frame structure in the prior art.

In a first case, for the frame structure shown in FIG. 2, the UL Grant supports the indication of discontinuous uplink SFs, and the uplink resource index has four bits. Table 3 lists a combination in the first case. In this combination, one or two uplink SFs are combined into one group.

TABLE 3

| Uplink Resource Index | DL: SF0, UL: SF1~SF6 (1:6) | DL: SF0, SF6 UL: SF1~SF5 (2:5) | DL: SF0, SF5~SF6 UL: SF1~SF4 (3:4) |
|---|---|---|---|
| 0000 | SF1 | SF1 | SF1 |
| 0001 | SF2 | SF2 | SF2 |
| 0010 | SF3 | SF3 | SF3 |
| 0011 | SF4 | SF4 | SF4 |
| 0100 | SF5 | SF5 | SF1 and SF2 |
| 0101 | SF6 | SF1 and SF2 | SF1 and SF3 |
| 0110 | SF1 and SF2 | SF1 and SF3 | SF1 and SF4 |
| 0111 | SF1 and SF3 | SF1 and SF4 | SF2 and SF3 |
| 1000 | SF1 and SF4 | SF1 and SF5 | SF2 and SF4 |
| 1001 | SF2 and SF3 | SF2 and SF3 | SF3 and SF4 |
| 1010 | SF2 and SF5 | SF2 and SF4 | Reserved |
| 1011 | SF3 and SF4 | SF2 and SF5 | Reserved |
| 1100 | SF3 and SF5 | SF3 and SF4 | Reserved |
| 1101 | SF3 and SF6 | SF3 and SF5 | Reserved |
| 1110 | SF4 and SF6 | SF4 and SF5 | Reserved |
| 1111 | SF5 and SF6 | Reserved | Reserved |

In a second case, for the frame structure shown in FIG. 2, the UL Grant supports the indication of continuous uplink SFs, and the uplink resource index has three bits. Table 4 lists a combination in the second case. In this combination, one or two uplink SFs are combined into one group.

TABLE 4

| Uplink Resource Index | DL: SF0, UL: SF1~SF6 (1:6) | DL: SF0, SF6 UL: SF1~SF5 (2:5) | DL: SF0, SF5~SF6 UL: SF1~SF4 (3:4) |
|---|---|---|---|
| 000 | SF1 | SF1 | SF1 |
| 001 | SF2 | SF2 | SF2 |
| 010 | SF3 | SF3 | SF3 |
| 011 | SF4 | SF4 | SF4 |
| 100 | SF5 | SF5 | SF1 and SF2 |
| 101 | SF6 | SF1 and SF2 | SF2 and SF3 |
| 110 | SF3 and SF4 | SF3 and SF4 | SF3 and SF4 |
| 111 | SF5 and SF6 | SF4 and SF5 | Reserved |

Figure 1:
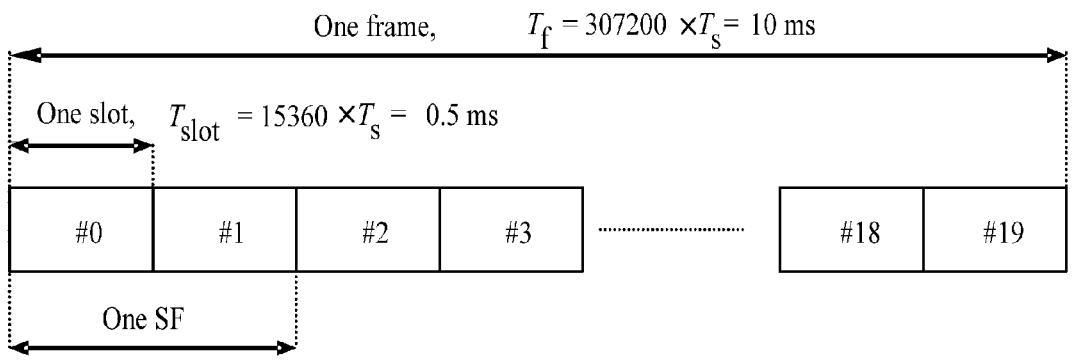
FIG. 1 is a schematic view of a first frame structure in the prior art.

In a third case, for the frame structure shown in FIG. 1, the uplink resource index has four bits. For the simplicity of illustration, only the uplink SFs are considered. In addition, for the convenience of illustration, when there is only one uplink SF, the uplink SF is represented as ULSF1; and when there are two uplink SFs, the two uplink SFs are represented as ULSF1 and ULSF2 respectively. The representation of other uplink SFs is similar. Table 5 lists a combination in the third case.

TABLE 5

| Uplink Resource Index | Four ULSFs | Three ULSFs | Two ULSFs | One ULSF | Zero ULSF |
|---|---|---|---|---|---|
| 0000 | ULSF1 | ULSF1 | ULSF1 | Reserved | Reserved |
| 0001 | ULSF2 | ULSF2 | ULSF2 | Reserved | Reserved |
| 0010 | ULSF3 | ULSF3 | ULSF1 and ULSF2 | Reserved | Reserved |
| 0011 | ULSF4 | ULSF1 and ULSF2 | Reserved | Reserved | Reserved |
| 0100 | ULSF1 and ULSF2 | ULSF1 and ULSF3 | Reserved | Reserved | Reserved |
| 0101 | ULSF1 and ULSF3 | ULSF2 and ULSF3 | Reserved | Reserved | Reserved |
| 0110 | ULSF1 and ULSF4 | Reserved | Reserved | Reserved | Reserved |
| 0111 | ULSF2 and ULSF3 | Reserved | Reserved | Reserved | Reserved |
| 1000 | ULSF3 and ULSF4 | Reserved | Reserved | Reserved | Reserved |
| 1001 | Reserved | Reserved | Reserved | Reserved | Reserved |
| 1010 | Reserved | Reserved | Reserved | Reserved | Reserved |
| 1011 | Reserved | Reserved | Reserved | Reserved | Reserved |
| 1100 | Reserved | Reserved | Reserved | Reserved | Reserved |
| 1101 | Reserved | Reserved | Reserved | Reserved | Reserved |
| 1110 | Reserved | Reserved | Reserved | Reserved | Reserved |
| 1111 | Reserved | Reserved | Reserved | Reserved | Reserved |

In a fourth case, for the frame structure shown in FIG. 1, the UL Grant supports the indication of continuous uplink SFs, and the uplink resource index has three bits. Table 6 lists a combination in the fourth case.

TABLE 6

| Uplink Resource Index | Four ULSFs | Three ULSFs | Two ULSFs | One ULSF | Zero ULSF |
|---|---|---|---|---|---|
| 000 | ULSF1 | ULSF1 | ULSF1 | Reserved | Reserved |
| 001 | ULSF2 | ULSF2 | ULSF2 | Reserved | Reserved |
| 010 | ULSF3 | ULSF3 | ULSF1 and ULSF2 | Reserved | Reserved |
| 011 | ULSF4 | ULSF1 and ULSF2 | Reserved | Reserved | Reserved |
| 100 | ULSF1 and ULSF2 | ULSF2 and ULSF3 | Reserved | Reserved | Reserved |
| 101 | ULSF2 and ULSF3 | Reserved | Reserved | Reserved | Reserved |
| 110 | ULSF3 and ULSF4 | Reserved | Reserved | Reserved | Reserved |
| 111 | Reserved | Reserved | Reserved | Reserved | Reserved |

In Step 502, the uplink resource index is carried in the UL Grant, and the uplink resource index is corresponding to at least one uplink resource.

In this embodiment, the UL Grant is that of the same user listed in Table 2, and the specific content of the UL Grant is shown in Table 7.

TABLE 7

5 MHz
UL

| Domain | Occupied Bits | Content |
|---|---|---|
| Resource Grant | 9 | Continuous physical resource blocks granted to a user |
| Transmission Format Indication/ Transmission Block Size + Modulation Code Format | 7 | Transmission format indication, modulation and information bits number and code formats |
| HARQ | 2 | Synchronous HARQ: 2-3 bits of serial number and implicit confirmation of previous transmission blocks |
| Power Control | 2 | Relative instructions |
| Pilot Instruction | 1 | Whether the pilot appears in the last long block (from other user terminals) or whether the last long block is configured to transmit data |
| Channel Quality Indication | 1 | The quality indication report about the channel scheduling should be included in the data |
| ACK/NACK Indication | 1 | Indicating that the user terminal should reserve resources for ACK/NACK on the physical uplink synchronous channel |
| Multi-antenna Technology | 2 | Determined by multi-user MIMO and uplink multi-antenna technology, 2 bits |
| User Terminal Identity + CRC | 20 | 16-24-bit CRC |
| Uplink Resource Index | 3 or 4 | Uplink resource indication |

In Step 503, the UL Grant carrying the uplink resource index is sent.

In this embodiment, the UL Grant carrying the uplink resource index is sent in a downlink SF.

In this embodiment, the optimal 3-bit or 4-bit uplink resource index is configured to indicate the uplink SF, and for the convenience of illustration, only the combination of one or two uplink SFs is described. Persons skilled in the art should understand that the embodiment of the present invention is not limited to the corresponding relations between the uplink resource index and the uplink SF in terms of indication listed in Table 3 to Table 7.

After receiving the UL Grant carrying the uplink resource index from a BS, a user terminal resolves the uplink resource index from the UL Grant, and performs the resource grant on the at least one uplink resource corresponding to the uplink resource index according to the corresponding relation between the uplink resource index and the at least one uplink resource in terms of indication obtained in advance. Here, after the BS establishes the corresponding relation in terms of indication, the user terminal may obtain the corresponding relation between the uplink resource index and the at least one uplink resource in terms of indication through static configuration or by dynamically acquiring from the BS.

In this embodiment, by carrying the uplink resource index in the UL Grant, one UL Grant of a user may indicate the resource grant of multiple uplink SFs. Thus, when an asymmetrical resource grant is performed in the TDD mode, especially when the uplink SFs are more than the downlink SFs, the corresponding relation between the UL Grant and the uplink SFs can be established. This embodiment realizes accurate indication of the at least one uplink resource through the uplink resource index, prevents repeated transmission of the same information in multiple uplink resources, effectively reduces the signaling overhead, and increases the resource utilization.

Figure 6:
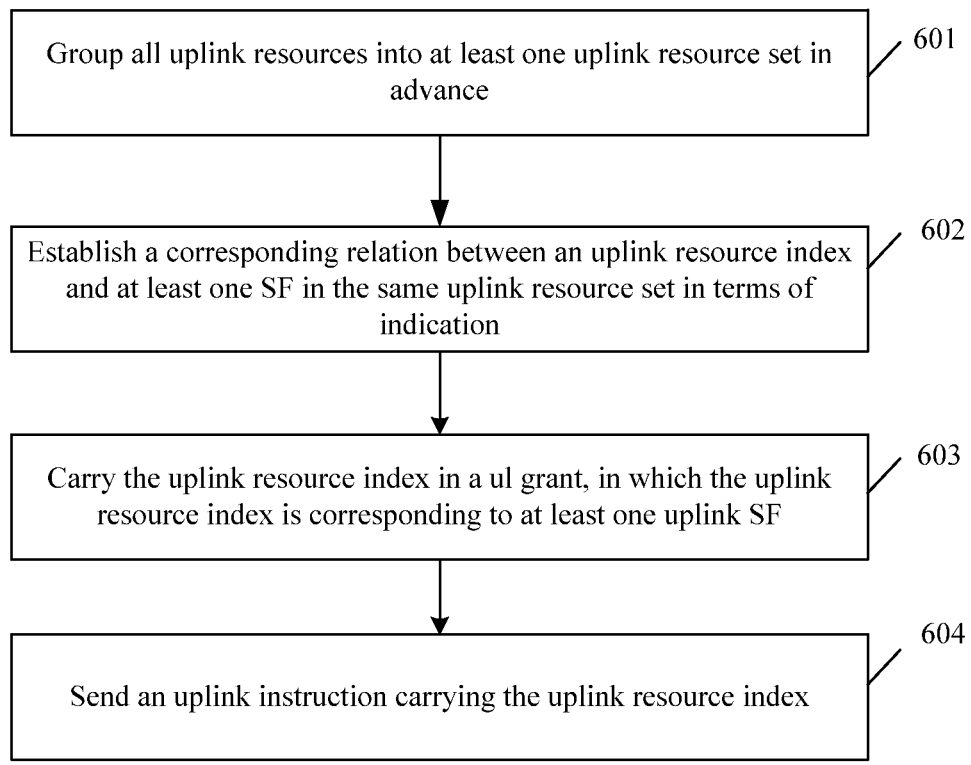
FIG. 6 is a schematic flow chart of a method for implementing uplink resource indication according to a second embodiment of the present invention.

FIG. 6 is a schematic flow chart of a method for implementing uplink resource indication according to a second embodiment of the present invention.

In Step 601, all uplink resources are grouped in at least one uplink resource set in advance.

In this embodiment, all of the uplink resources are grouped into at least one uplink resource set according to the corresponding relation between the downlink SF for sending the UL Grant and the uplink SFs in terms of indication.

In this embodiment, the frame structure in FIG. 2 is adopted, and the corresponding relation between the downlink SFs and the uplink SF set in terms of indication listed in Table 8 is set in advance. For example, when the uplink and downlink SF ratio is 4:3, if SF6 is configured to send the UL Grant carrying the uplink resource index, the UL Grant is directed to SF2; and if SF0 is configured to send the UL Grant carrying the uplink resource index, the UL Grant is directed to SF3 and SF4.

TABLE 8

| Uplink and Downlink SF Ratio (UL:DL) | SF1 | SF2 | SF3 | SF4 | SF5 | SF6 | SF0 |
|---|---|---|---|---|---|---|---|
| 4:3 | — | — | — | — | SF1 | SF2 | SF3 and SF4 |
| 5:2 | — | — | — | — | — | SF1 and SF2 | SF3, SF4, and SF5 |
| 6:1 | — | — | — | — | — | — | SF1, SF2, SF3, SF4, SF5, and SF6 |

In Step 602, a corresponding relation between an uplink resource index and at least one uplink resource in terms of indication is established.

The corresponding relation between the uplink resource index and the at least one uplink resource may be established as follows. The at least one uplink resource in each uplink resource set is combined into one group, and the uplink resources in each group are not completely the same. Each group in the same uplink resource set is corresponding to one uplink resource index, so as to establish the corresponding relation between the uplink resource index and at least one uplink resource in the same uplink resource group in terms of indication.

In this embodiment, for the frame structure shown in FIG. 2, according to the corresponding relation between the downlink SFs and the uplink SF set listed in Table 8, the uplink resource indexes in different bits are configured to establish the corresponding relation between different uplink resource indexes and at least one uplink SF in terms of indication. Two circumstances are described as follows.

In a first case, for the frame structure shown in FIG. 2, the uplink resource index has four bits. Table 9 lists a combination in the first case.

TABLE 9

| Uplink Resource Index | DL: SF0, UL: SF1~SF6 (1:6) | DL: SF0, SF6 UL: SF1~SF5 (2:5) | | DL: SF0, SF5~SF6 UL: SF1~SF4 (3:4) | | |
|---|---|---|---|---|---|---|
| | | SF6 | SF0 | SF5 | SF6 | SF0 |
| 0000 | SF1 | SF1 | SF5 | Reserved | | SF3 |
| 0001 | SF2 | SF2 | SF3 | Reserved | | SF4 |
| 0010 | SF3 | SF1 and SF2 | SF4 and SF5 | Reserved | | |
| 0011 | SF4 | Reserved | SF4 and SF3 | Reserved | | |
| 0100 | SF5 | Reserved | SF5 and SF3 | Reserved | | |
| 0101 | SF6 | Reserved | | Reserved | | |
| 0110 | SF1 and SF2 | Reserved | | Reserved | | |
| 0111 | SF1 and SF3 | Reserved | | Reserved | | |
| 1000 | SF1 and SF4 | Reserved | | Reserved | | |
| 1001 | SF2 and SF4 | Reserved | | Reserved | | |
| 1010 | SF2 and SF5 | Reserved | | Reserved | | |
| 1011 | SF3 and SF4 | Reserved | | Reserved | | |
| 1100 | SF3 and SF5 | Reserved | | Reserved | | |
| 1101 | SF3 and SF6 | Reserved | | Reserved | | |
| 1110 | SF4 and SF6 | Reserved | | Reserved | | |
| 1111 | SF5 and SF6 | Reserved | | Reserved | | |

In a second case, for the frame structure shown in FIG. 2, the UL Grant supports the indication of discontinuous uplink SFs, and the uplink resource index has three bits. Table 10 lists a combination in the second case.

TABLE 10

| Uplink Resource Index | DL: SF0, UL: SF1~SF6 (1:6) | DL: SF0, SF6 UL: SF1~SF5 (2:5) | | DL: SF0, SF5~SF6 UL: SF1~SF4 (3:4) | | |
|---|---|---|---|---|---|---|
| | | SF6 | SF0 | SF5 | SF6 | SF0 |
| 000 | SF1 | SF1 | SF5 | Reserved | | SF3 |
| 001 | SF2 | SF2 | SF3 | Reserved | | SF4 |
| 010 | SF3 | SF1 and SF2 | SF4 and SF5 | Reserved | | |
| 011 | SF4 | Reserved | SF4 and SF3 | Reserved | | |
| 100 | SF5 | Reserved | SF5 and SF3 | Reserved | | |
| 101 | SF6 | Reserved | | Reserved | | |
| 110 | SF1 and SF2 | Reserved | | Reserved | | |
| 111 | SF1 and SF3 | Reserved | | Reserved | | |

Certainly, in this embodiment, the frame structure shown in FIG. 1 may also be adopted. Thereby, the corresponding relation between the downlink SFs and the uplink resource set listed in Table 11 may be set in advance in Step 601.

TABLE 11

| Uplink and Downlink SF Ratio (DL:UL) | DLSF0 | DLSF1 |
|---|---|---|
| 1:4 | ULSF0, ULSF1, ULSF2, and ULSF3 | — |
| 2:3 | ULSF0 and ULSF1 | ULSF2 |
| 2:4 | ULSF0 and ULSF1 | ULSF2 and ULSF3 |

For the frame structure shown in FIG. 1, according to the corresponding relation between the downlink SFs and the uplink SF set listed in Table 11, the uplink resource indexes in different bits are configured to establish the corresponding relation between the uplink resource indexes and at least one uplink SF in terms of indication. Two circumstances are described as follows.

In a first case, for the frame structure shown in FIG. 1, the UL Grant supports the indication of discontinuous uplink SFs, and the uplink resource index has four bits. Table 12 lists a combination in the first case.

TABLE 12

| Uplink Resource Index | DL: DLSF0, UL: ULSF0~3 (1:4) | DL: DLSF0~1 UL: ULSF0~2 (2:3) | | DL: DLSF0~1 UL: ULSF0~3 (2:4) | |
|---|---|---|---|---|---|
| | | DLSF0 | DLSF1 | DLSF0 | DLSF1 |
| 0000 | ULSF1 | ULSF0 | Reserved | ULSF0 | ULSF2 |
| 0001 | ULSF2 | ULSF1 | Reserved | ULSF1 | ULSF3 |
| 0010 | ULSF3 | Reserved | | Reserved | |
| 0011 | ULSF0 | Reserved | | Reserved | |
| 0100 | ULSF1 and ULSF2 | Reserved | | Reserved | |
| 0101 | ULSF1 and ULSF3 | Reserved | | Reserved | |
| 0110 | ULSF1 and ULSF0 | Reserved | | Reserved | |
| 0111 | ULSF2 and ULSF3 | Reserved | | Reserved | |
| 1000 | ULSF3 and ULSF0 | Reserved | | Reserved | |
| 1001 | Reserved | Reserved | | Reserved | |
| 1010 | Reserved | Reserved | | Reserved | |
| 1011 | Reserved | Reserved | | Reserved | |
| 1100 | Reserved | Reserved | | Reserved | |
| 1101 | Reserved | Reserved | | Reserved | |
| 1110 | Reserved | Reserved | | Reserved | |
| 1111 | Reserved | Reserved | | Reserved | |

In a second case, for the frame structure shown in FIG. 1, the UL Grant supports the indication of discontinuous uplink SFs, and the uplink resource index has three bits. Table 13 lists a combination in the second case.

TABLE 13

| Uplink Resource Index | DL: DLSF0, UL: ULSF0~3 (1:4) | DL: DLSF0~1 UL: ULSF0~2 (2:3) | | DL: DLSF0~1 UL: ULSF0~3 (2:4) | |
|---|---|---|---|---|---|
| | | DLSF0 | DLSF1 | DLSF0 | DLSF1 |
| 000 | ULSF1 | ULSF0 | Reserved | ULSF0 | ULSF2 |
| 001 | ULSF2 | ULSF1 | Reserved | ULSF1 | ULSF3 |
| 010 | ULSF3 | Reserved | | Reserved | |
| 011 | ULSF0 | Reserved | | Reserved | |
| 100 | ULSF1 and ULSF2 | Reserved | | Reserved | |
| 101 | ULSF1 and ULSF3 | Reserved | | Reserved | |
| 110 | ULSF1 and ULSF0 | Reserved | | Reserved | |
| 111 | ULSF2 and ULSF3 | Reserved | | Reserved | |

In Step 603, the uplink resource index is carried in the UL Grant, and the uplink resource index is corresponding to at least one uplink resource.

In this embodiment, the uplink resource index for indicating the uplink resource is carried in another UL Grant. The specific content is shown in Table 14.

TABLE 14

| | $N_{RA\text{-}MAP}$-bits | 16-bits | 4-bits | 4-bits | 1-bit | 5-bits | 3/4 bits |
|---|---|---|---|---|---|---|---|
| SIMO-OL TxDiv | Resource grant | User terminal identity (CRC) | First code word in multiple code words | Second code word in multiple code words | Reserved | Signaling related to HARQ | Uplink resource index Indicating which frame is scheduled in the TDD |
| SIMO-CL TxDiv | Resource grant | User terminal identity (CRC) | First code word in multiple code words | Second code word in multiple code words | Precoding matrix indication and selection | Signaling related to HARQ | Uplink resource index |
| SU-MIMO-1CW | Resource grant | User terminal identity (CRC) | First code word in multiple code words | Second code word in multiple code words | Precoding matrix indication and selection | Signaling related to HARQ | Indicating which frame is scheduled in the TDD |
| SU-MIMO-2CW | Resource grant | User terminal identity (CRC) | First code word in multiple code words | Second code word in multiple code words | Precoding matrix indication and selection | Signaling related to HARQ | Uplink resource index |
| MU-MIMO | Resource grant | User terminal identity (CRC) | First code word in multiple code words | Second code word in multiple code words | Precoding matrix indication and selection | Signaling related to HARQ | Indicating which frame is scheduled in the TDD |
| BEAM-FORMING | Resource grant | User terminal identity (CRC) | First code word in multiple code words | Second code word in multiple code words | Precoding matrix indication and selection | Signaling related to HARQ | Uplink resource index |

In Step 604, the UL Grant carrying the uplink resource index is sent.

In this embodiment, all uplink resources are grouped into at least one uplink resource set, the uplink SF set corresponding to the UL Grant is preliminarily determined according to the downlink SF for sending the UL Grant, and the specific uplink resources are indicated according to the uplink resource index added in the UL Grant.

In this embodiment, according to the preset corresponding relation between the downlink SFs and the uplink SF set, all of the uplink SFs are grouped into at least one uplink SF set. For uplink slots, according to the preset corresponding relation between the downlink slot and the uplink slot set, all of the uplink SFs are grouped into at least one uplink slot set. In this case, the user terminal needs to obtain the mode for grouping the uplink resource set statically or dynamically, and the indicated uplink resource is determined according to the obtained uplink resource set and the uplink resource index.

In the current 3GPP LTE standard, the resource grant is performed in a downlink acknowledgement (DLACK) mode, and the resources are corresponding to the UL Grant one by one. When the resource grant of multiple uplink resources is represented by one UL Grant, data packets of the uplink resources are corresponding to one acknowledgement channel, which may carry information of only two bits. Therefore, in this embodiment, one UL Grant can indicate the resource grant of at most two uplink resources.

This embodiment realizes accurate indication of the at least one uplink resource through the uplink resource index, prevents repeated transmission of the same information in multiple uplink resources, effectively reduces the signaling overhead, and increases the resource utilization.

Figure 7:
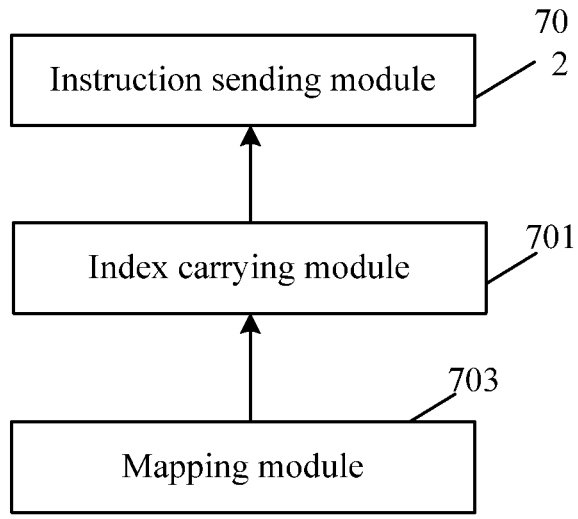
FIG. 7 is a schematic structural view of a BS for implementing uplink resource indication according to a third embodiment of the present invention.

FIG. 7 is a schematic structural view of a BS for implementing uplink resource indication according to a third embodiment of the present invention. The BS includes an index carrying module 701 and an instruction sending module 702.

The index carrying module 701 is configured to carry an uplink resource index in a ul grant, in which the uplink resource index is corresponding to at least one uplink resource in terms of indication.

The instruction sending module 702 is configured to send the ul grant generated by the index carrying module 701.

The BS further includes a mapping module 703.

The mapping module 703 is configured to establish a corresponding relation between an uplink resource index and at least one uplink resource in terms of indication.

This embodiment realizes accurate indication of the at least one uplink resource through the uplink resource index, prevents repeated transmission of the same information in multiple uplink resources, effectively reduces the signaling overhead, and increases the resource utilization.

Figure 8:
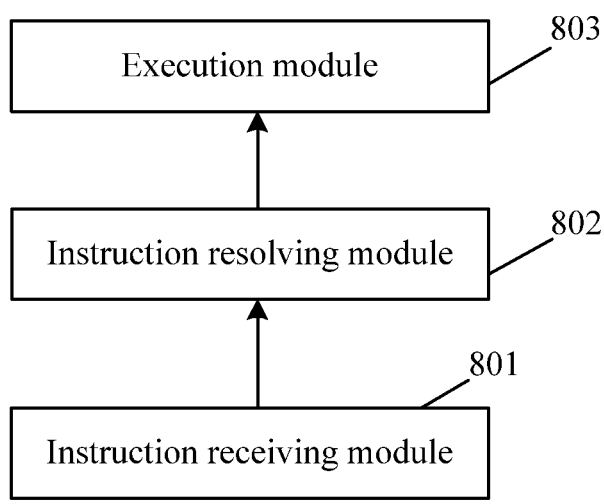
FIG. 8 is a schematic structural view of a user terminal according to a third embodiment of the present invention.

FIG. 8 is a schematic structural view of a user terminal according to a fourth embodiment of the present invention.

The user terminal includes an instruction receiving module 801, an instruction resolving module 802, and an execution module 803.

The instruction receiving module 801 is configured to receive a UL Grant from a BS, in which the UL Grant carries an uplink resource index, and the uplink resource index is corresponding to at least one uplink resource in terms of indication.

The instruction resolving module 802 is configured to resolve the uplink resource index from the UL Grant received by the instruction receiving module 801.

The execution module 803 is configured to obtain the at least one uplink resource corresponding to the uplink resource index resolved by the instruction resolving module 802 according to a corresponding relation between the uplink resource index and the at least one uplink resource in terms of indication obtained in advance, and perform the resource grant on the obtained at least one uplink resource.

This embodiment realizes accurate indication of the at least one uplink resource through the uplink resource index, prevents repeated transmission of the same information in multiple uplink resources, effectively reduces the signaling overhead, and increases the resource utilization.

Figure 9:
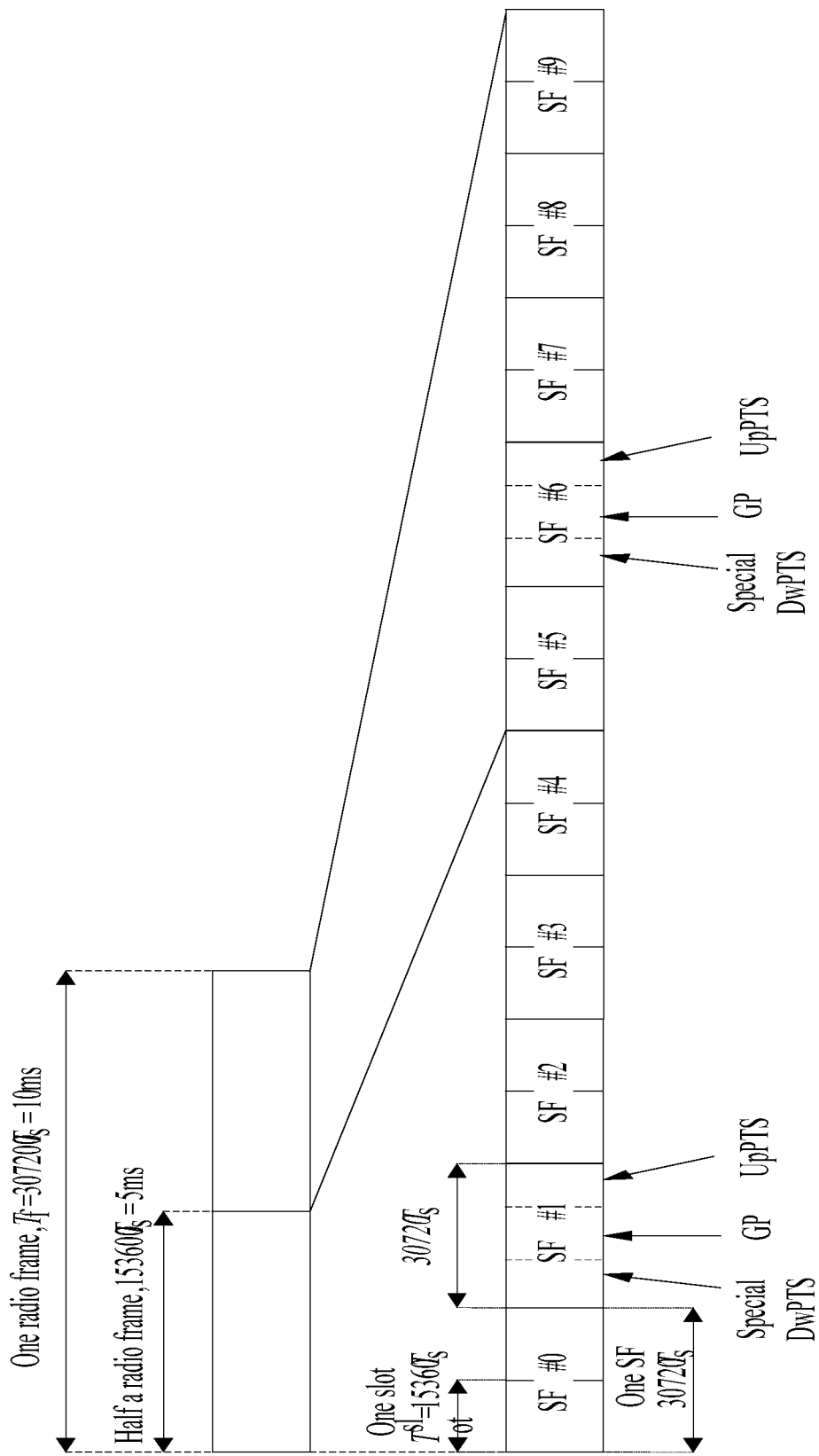
FIG. 9 is a schematic view of a frame structure according to an embodiment of the present invention.

As shown in FIG. 9, a radio frame is composed by 20 slots, a period of a frame is 10 ms, a frame is divided into two half-frames, each half-frame is composed by five SFs, the first half-frame includes SF0-SF4, and the second half-frame includes SF5-SF9. SF1 and SF6 are respectively formed by a special downlink pilot time slot (DwPTS), a guard period (GP), and an uplink pilot time slot (UpPTS), and serve as transfer points of uplink and downlink SFs. SF6 may also not be configured as a transfer point. Thereby, the entire frame is used as a downlink frame.

Figure 10:
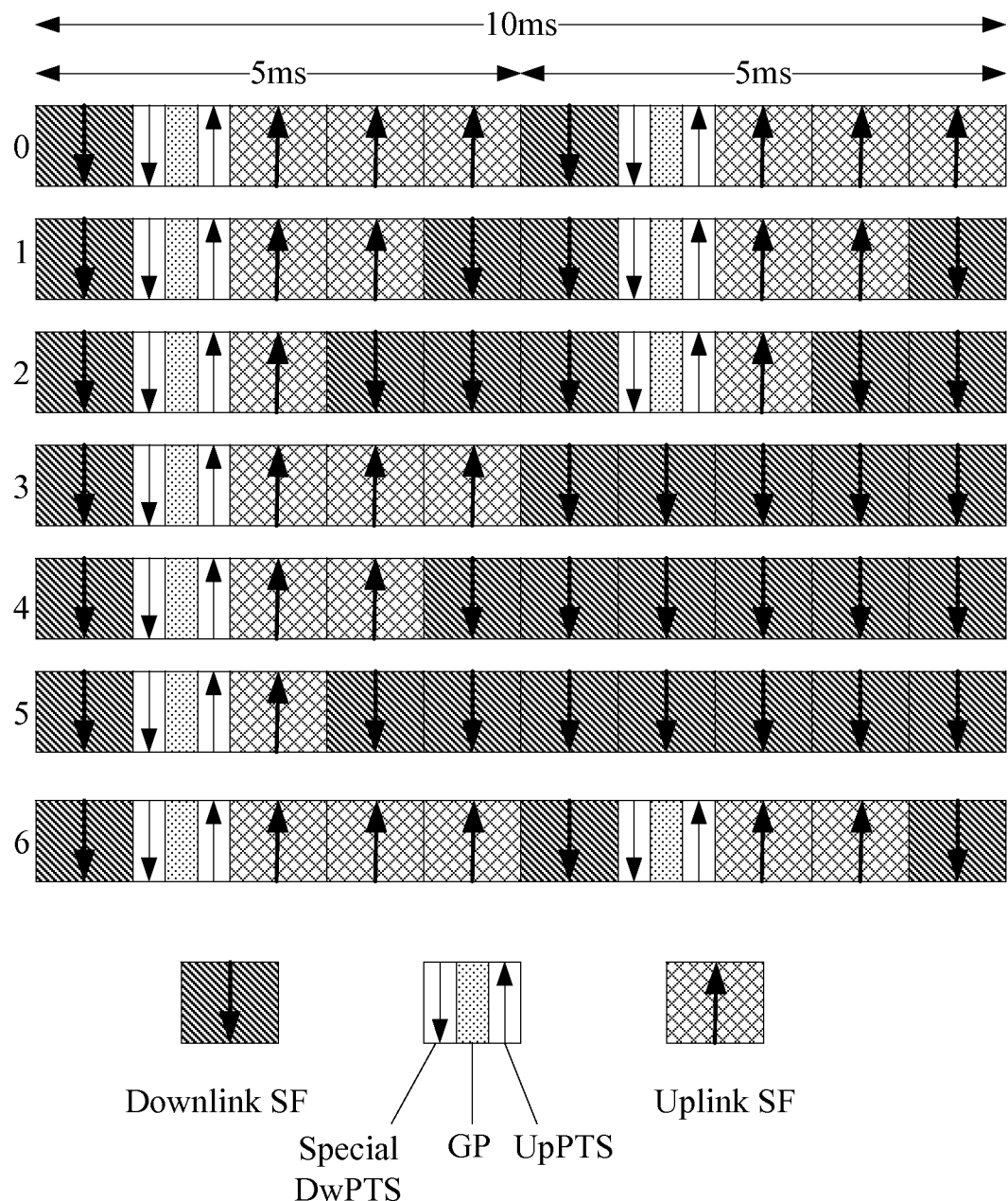
FIG. 10 is a schematic view of various uplink and downlink RF ratios in a TDD frame structure according to an embodiment of the present invention.

In the frame structure in the TDD mode, one frame includes several SFs or slots. The SFs may be classified into uplink SFs and downlink SFs, and a TDD system may use a transfer point to transfer the SF types flexibly. For example, in the current 3GPP LTE standard, different SF grant ratios are specified. FIG. 10 is a schematic view of various uplink and downlink SF ratios in the frame structure shown in FIG. 9. FIG. 10 lists seven configuration results of a frame. The frame includes ten SFs, namely SF0-SF9. In different configurations, the uplink and downlink SF ratios in a frame are different. A table of uplink and downlink SF ratios (Table 15) is concluded from FIG. 10. Table 15 lists the circumstances of one and two transfer points.

Figure 11:
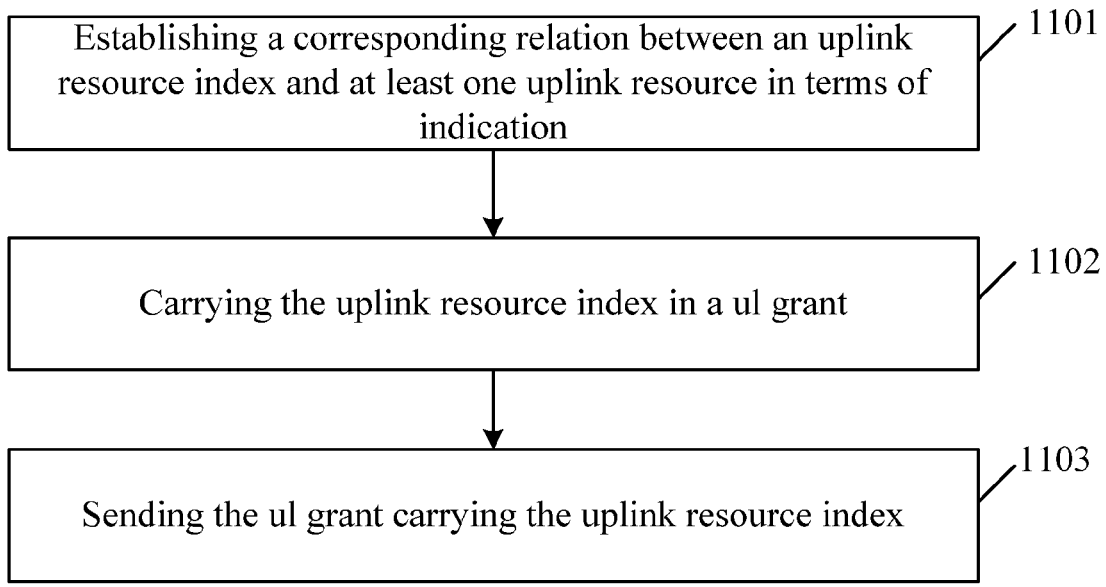
FIG. 11 is a schematic flow chart of a method for implementing uplink resource indication according to a fifth embodiment of the present invention.

FIG. 11 is a schematic flow chart of a method for implementing uplink resource indication according to a fifth embodiment of the present invention.

In Step 1101, a corresponding relation between an uplink resource index and at least one uplink resource in terms of indication is established.

The method for establishing the corresponding relation between the uplink resource index and the at least one uplink resource in terms of indication is as follows. The at least one uplink resource is combined into one group, and the uplink resources in each group are not completely the same. Each group is corresponding to an uplink resource index, so as to establish the corresponding relation between the uplink resource index and the at least one uplink resource in terms of indication.

In this embodiment, uplink resource indexes of different bits are used for different frame structures, so different corresponding relations between the uplink resource index and at least one uplink SF can be established. The establishing the corresponding relation between the uplink resource index and the at least one uplink SF in terms of indication in different situations are described in detail below. Persons skilled in the art should understand that only some specific examples of the technical solutions according to the embodiment of the present invention are described below, and the present invention is not limited thereto.

For the frame structure shown in FIG. 10, the UL Grant supports the indication of continuous uplink SFs, and the uplink resource index has three bits. Table 16 lists a combination in a first case. In this combination, one or two uplink SFs are combined into one group.

TABLE 16

| Uplink Resource Index | Uplink Resources (3 Uplink SFs: SF2~SF4) |
|---|---|
| 000 | SF2 |
| 001 | SF3 |
| 010 | SF4 |
| 011 | SF2 and SF3 |
| 100 | SF2 and SF4 |
| 101 | SF3 and SF4 |
| 110 | Reserved |
| 111 | Reserved |

In Step 1102, the uplink resource index is carried in the UL Grant, and the uplink resource index is corresponding to at least one uplink resource.

TABLE 15

| Configuration | SF Number | | | | | | | | | | Uplink and Downlink Ratio (Downlink:Uplink) |
|---|---|---|---|---|---|---|---|---|---|---|---|
| | 0 | 1 | 2 | 3 | 4 | 5 | 6 | 7 | 8 | 9 | |
| 0 | Downlink | Transfer point | Uplink | Uplink | Uplink | Downlink | Transfer point | Uplink | Uplink | Uplink | 1:3 |
| 1 | Downlink | Transfer point | Uplink | Uplink | Downlink | Downlink | Transfer point | Uplink | Uplink | Downlink | 2:2 |
| 2 | Downlink | Transfer point | Uplink | Downlink | Downlink | Downlink | Transfer point | Uplink | Downlink | Downlink | 3:1 |
| 3 | Downlink | Transfer point | Uplink | Uplink | Uplink | Downlink | Downlink | Downlink | Downlink | Downlink | 6:3 |
| 4 | Downlink | Transfer point | Uplink | Uplink | Downlink | Downlink | Downlink | Downlink | Downlink | Downlink | 7:2 |
| 5 | Downlink | Transfer point | Uplink | Downlink | Downlink | Downlink | Downlink | Downlink | Downlink | Downlink | 8:1 |
| 6 | Downlink | Transfer point | Uplink | Uplink | Uplink | Downlink | Transfer point | Uplink | Uplink | Downlink | 3:5 |

In this embodiment, the UL Grant is that of the same user listed in Table 2, and the specific content of the UL Grant is as listed in Table 17.

TABLE 17

5 MHz UL

| Domain | Occupied Bits | Content |
| --- | --- | --- |
| Resource Grant | 9 | Continuous physical resource blocks granted to a user |
| Transmission Format Indication/ Transmission Block Size + Modulation Code Format | 7 | Transmission format indication, modulation and information bits number and code formats |
| HARQ | 2 | Synchronous HARQ: 2-3 bits of serial number and implicit confirmation of previous transmission blocks |
| Power Control | 2 | Relative instructions |
| Pilot Instruction | 1 | Whether the pilot appears in the last long block (from other user terminals) or whether the last long block is configured to transmit data |
| Channel Quality Indication | 1 | The quality report about the channel scheduling should be included in the data |
| ACK/NACK Indication | 1 | Indicating that the user terminal should reserve resources for ACK/NACK on the physical uplink synchronous channel |
| Multi-antenna Technology | 2 | Determined by multi-user MIMO and uplink multi-antenna technology, 2 bits |
| User Terminal Identity + CRC | 20 | 16-24-bit CRC |
| Uplink Resource Index | 3 or 4 | Uplink resource indication |

In Step 1103, the ul grant carrying the uplink resource index is sent.

In this embodiment, the ul grant carrying the uplink resource index is sent in a downlink SF.

In this embodiment, the optimal 3-bit uplink resource index is configured to indicate the uplink SF, and for the convenience of illustration, only the combination of one or two uplink SFs is described. Persons skilled in the art should understand that the embodiment of the present invention is not limited to the corresponding relations between the uplink SF index and the uplink SF in terms of indication listed in Table 3 and Table 4.

After receiving the UL Grant carrying the uplink resource index from a BS, a user terminal resolves the uplink resource index from the UL Grant, and performs the resource grant on the at least one uplink resource corresponding to the uplink resource index according to the corresponding relation between the uplink resource index and the at least one uplink resource in terms of indication obtained in advance. Here, after the BS establishes the corresponding relation in terms of indication, the user terminal may obtain the corresponding relation between the uplink resource index and the at least one uplink resource in terms of indication through static configuration or by dynamically acquiring from the BS.

In this embodiment, by carrying the uplink resource index in the UL Grant, one UL Grant of a user may indicate the resource grant of multiple uplink SFs. Thus, when an asymmetrical resource grant is performed in the TDD mode, especially when the uplink SFs are more than the downlink SFs, the corresponding relation between the UL Grant and the uplink SFs can be established. This embodiment realizes accurate indication of the at least one uplink resource through the uplink resource index, prevents repeated transmission of the same information in multiple uplink resources, effectively reduces the signaling overhead, and increases the resource utilization.

Figure 12:
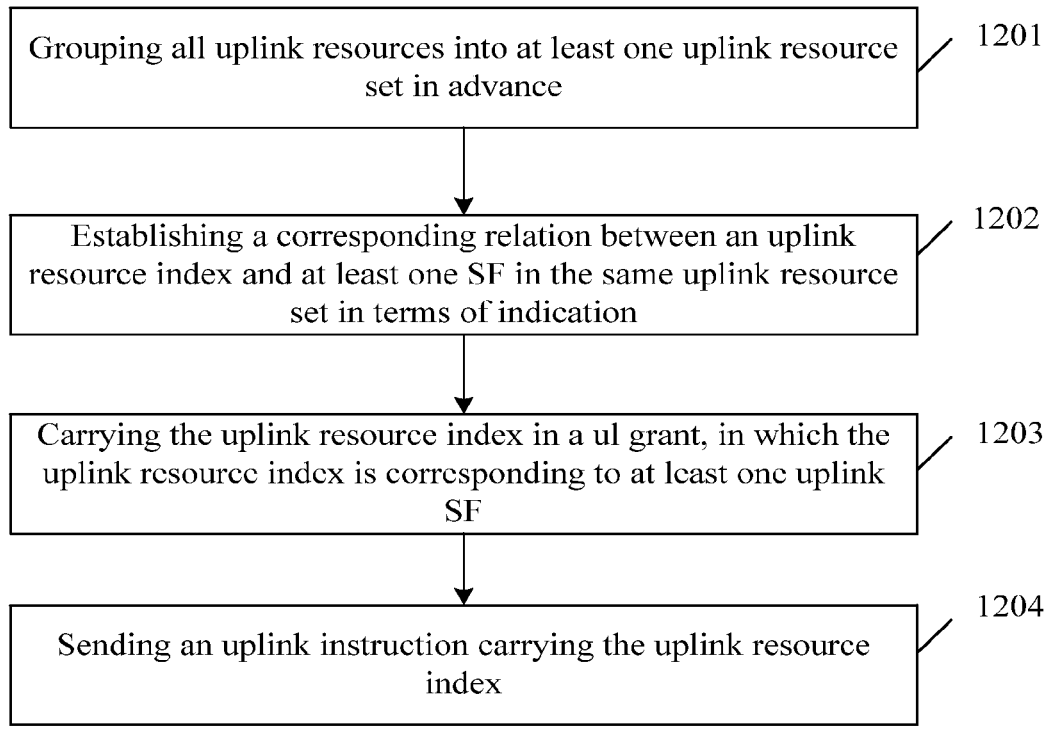
FIG. 12 is a schematic flow chart of a method for implementing uplink resource indication according to a sixth embodiment of the present invention.

FIG. 12 is a schematic flow chart of a method for implementing uplink resource indication according to a sixth embodiment of the present invention.

In Step 1201, all uplink resources are grouped in at least one uplink resource set in advance.

In this embodiment, all of the uplink resources are grouped into at least one uplink resource set according to the corresponding relation between the downlink SF for sending the UL Grant and the uplink SFs in terms of indication.

In this embodiment, the frame structure in FIG. 10 is adopted, and the corresponding relation between the downlink SFs and the uplink SF set in terms of indication listed in Table 18 is set in advance. For example, when the uplink and downlink SF ratio (UL:DL) is 3:1, if SF0 is configured to send the UL Grant carrying the uplink resource index, the UL Grant is directed to SF4 of the current period and SF2* of the next period; and if SF1 is configured to send the UL Grant carrying the uplink resource index, the UL Grant is directed to SF2* and SF3* of the next period.

TABLE 18

| Uplink and Downlink SF Ratio (UL:DL) | SF0 | SF1 | SF2 | SF3 | SF4 |
| --- | --- | --- | --- | --- | --- |
| 3:1 | SF4 and SF2* | SF2* and SF3* | — | — | — |

In Step 1202, a corresponding relation between an uplink resource index and at least one uplink resource in terms of indication is established.

The corresponding relation between the uplink resource index and the at least one uplink resource may be established as follows. The at least one uplink resource in each uplink resource set is combined into one group, and the uplink resources in each group are not completely the same. Each group in the same uplink resource set is corresponding to one uplink resource index, so as to establish the corresponding relation between the uplink resource index and at least one uplink resource in the same uplink resource group in terms of indication.

In this embodiment, according to the corresponding relation between the downlink SF and the uplink SF set, the uplink resource indexes in different bits are configured to establish the corresponding relation between different uplink resource indexes and at least one uplink SF in terms of indication. For example, for the frame structure shown in FIG. 10, the uplink resource index has two bits; and according to the corresponding relation listed in Table 18, a combination listed in Table 19 is obtained.

TABLE 19

| Uplink Resource Index (2 bit) | DL: SF0, SF1 UL: SF2~SF4 (DL:UL is 1:3) | |
| --- | --- | --- |
| | SF0 | SF1 |
| 00 | SF4 | SF2* |
| 01 | SF2* | SF3* |
| 10 | SF4 and SF2* | SF2* and SF3* |
| 11 | Reserved | Reserved |

In Step 1203, the uplink resource index is carried in the UL Grant, and the uplink resource index is corresponding to at least one uplink resource.

In this embodiment, the uplink resource index for indicating the uplink resource is carried in another UL Grant. The specific content is shown in Table 20.

TABLE 20

| | $N_{RA\text{-}MAP}$-bits | 16-bits | 4-bits | 4-bits | 1-bit | 5-bits | 2 bits |
|---|---|---|---|---|---|---|---|
| SIMO-OL TxDiv | Resource grant | User terminal identity (CRC) | First code word in multiple code words | Second code word in multiple code words | Reserved | Signaling related to HARQ | Uplink resource index Indicating which frame is scheduled in the TDD |
| SIMO-CL TxDiv | Resource grant | User terminal identity (CRC) | First code word in multiple code words | Second code word in multiple code words | Precoding matrix indication and selection | Signaling related to HARQ | Uplink resource index |
| SU-MIMO-1CW | Resource grant | User terminal identity (CRC) | First code word in multiple code words | Second code word in multiple code words | Precoding matrix indication and selection | Signaling related to HARQ | Indicating which frame is scheduled in the TDD |
| SU-MIMO-2CW | Resource grant | User terminal identity (CRC) | First code word in multiple code words | Second code word in multiple code words | Precoding matrix indication and selection | Signaling related to HARQ | Uplink resource index |
| MU-MIMO | Resource grant | User terminal identity (CRC) | First code word in multiple code words | Second code word in multiple code words | Precoding matrix indication and selection | Signaling related to HARQ | Indicating which frame is scheduled in the TDD |
| BEAM-FORMING | Resource grant | User terminal identity (CRC) | First code word in multiple code words | Second code word in multiple code words | Precoding matrix indication and selection | Signaling related to HARQ | Uplink resource index |

In Step 1204, the UL Grant carrying the uplink resource index is sent.

In this embodiment, all uplink resources are grouped into at least one uplink resource set, the uplink SF set corresponding to the UL Grant is preliminarily determined according to the downlink SF for sending the UL Grant, and the specific uplink resources are indicated according to the uplink resource index added in the UL Grant.

In this embodiment, according to the preset corresponding relation between the downlink SF and the uplink SF set, all of the uplink SFs are grouped into at least one uplink SF set. For uplink slots, according to the preset corresponding relation between the downlink slot and the uplink slot set in terms of indication, all of the uplink SFs are grouped into at least one uplink slot set. In this case, the user terminal needs to obtain the mode for grouping the uplink resource set statically or dynamically, and the indicated uplink resource is determined according to the obtained uplink resource set and the uplink resource index.

In the current 3GPP LTE standard, the resource grant is performed in a DLACK mode, and the resources are corresponding to the UL Grants one by one. When the resource grant of multiple uplink resources is represented by one UL Grant, data packets of the multiple uplink resources are corresponding to one acknowledgement channel, which may carry information of only two bits. Therefore, in this embodiment, one UL Grant can indicate the resource grant of at most two uplink resources. If too many packets are indicated, in the retransmission, the packets cannot be terminated at the same time, which makes the subsequent scheduling more complicated. Therefore, the comprehensive consideration of resource grant of two uplink resources is a reasonable processing mode.

This embodiment realizes accurate indication of the at least one uplink resource through the uplink resource index, prevents repeated transmission of the same information in multiple uplink resources, effectively reduces the signaling overhead, and increases the resource utilization.

All or a part of the content of the technical solutions according to the embodiments may be implemented through software programming. The software program is stored in a readable storage media, for example, a hard disk, an optical disk, or a floppy disk in a computer.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for implementing an uplink resource grant (UL Grant), comprising:
    identifying, by a base station, a downlink subframe in a plurality of downlink subframes in a radio frame, wherein each downlink subframe corresponds to an unique uplink subframe set, each uplink subframe set comprises a plurality of uplink subframe groups, each uplink subframe group corresponds to an uplink resource index and is identified by the uplink resource index, each uplink subframe group has an unique uplink subframe grouping specifying at least one uplink subframe in a time domain, and at least one group in the plurality of uplink subframe groups comprises at least two uplink subframes; and
    sending, by the base station, an UL Grant to a user terminal on the downlink subframe, wherein the UL Grant includes a first uplink resource index corresponding to a first uplink subframe group in a first uplink subframe set, and the first uplink subframe set corresponds to the downlink subframe.

2. The method of claim 1, the method further comprising:
    receiving, by the base station, data on each of the at least one uplink subframe specified in the time domain in the first uplink subframe group.

3. The method of claim 1, wherein each uplink subframe group has an unique uplink subframe grouping defining at least one uplink subframe different from one or more uplink subframes for other uplink subframe groups in the plurality of uplink subframe groups.

4. The method of claim 1, wherein the uplink resource index is provided with a length of two bits.

5. A base station, comprising:
    a processor, configured to identify a downlink subframe in a plurality of downlink subframes in a radio frame, wherein each downlink subframe corresponds to an unique uplink subframe set, each uplink subframe set comprises a plurality of uplink subframe groups, each uplink subframe group corresponds to an uplink resource index and is identified by the uplink resource index, each uplink subframe group has an unique uplink subframe grouping specifying at least one uplink subframe in a time domain, and at least one group in the plurality of uplink subframe groups corresponds to at least two uplink subframes; and
    a transmitter, configured to send an uplink resource grant (UL Grant) to a user terminal on the downlink subframe, wherein the UL Grant includes a first uplink resource index, the first uplink resource index corresponds to a first uplink subframe group in a first uplink subframe set, and the first uplink subframe set corresponds to the downlink subframe.

6. The base station of claim 5, further comprising:
    a receiver, configured to receive data on each of the at least one uplink subframe specified in the time domain in the first uplink subframe group.

7. The base station of claim 5, wherein each uplink subframe group is provided with an unique uplink subframe grouping defining at least one uplink subframe different from at least one uplink subframes for other uplink subframe groups in the plurality of uplink subframe groups.

8. The base station of claim 5, wherein the uplink resource index is provided with a length of two bits.

9. A method for implementing an uplink resource grant (UL Grant) comprising:
    identifying, by a processor, a downlink subframe in a plurality of downlink subframes in a radio frame, wherein each downlink subframe corresponds to an unique uplink subframe set comprising a plurality of uplink subframe groups, each uplink subframe group corresponds to an uplink resource index and identified by the uplink resource index, each uplink subframe group has an unique uplink subframe grouping specifying at least one uplink subframe in a time domain, and at least one group in the plurality of uplink subframe groups comprises at least two uplink subframes; and
    controlling, by the processor, transmission of a user terminal uplink resource grant on the downlink subframe, wherein the UL Grant including a first uplink resource index corresponds to a first uplink subframe group in a first uplink subframe set, and the first uplink subframe set corresponds to the downlink subframe.

10. The method of claim 9, the method further comprising:
    controlling, by the processor, reception of data on each of the at least one uplink subframe specified in the time domain in the uplink subframe group.

11. The method of claim 9, wherein each uplink subframe group comprises an unique uplink subframe grouping defining at least one uplink subframe different from at least one uplink subframes for other uplink subframe groups in the plurality of uplink subframe groups.

12. The method of claim 9, wherein the uplink resource index is provided with a length of two bits.

13. An apparatus, comprising:
    a storage medium including executable instructions; and
    a processor;
    wherein the executable instructions, when executed by the processor, cause the apparatus to:
    identify a downlink subframe in a plurality of downlink subframes in a radio frame, each downlink subframe corresponding to an unique uplink subframe set, each uplink subframe set comprising a plurality of uplink subframe groups corresponding to an uplink resource index and identified by the uplink resource index, each uplink subframe group having an unique uplink subframe grouping specifying at least one uplink subframe in a time domain, and at least one group in the plurality of uplink subframe groups comprising at least two uplink subframes;
    control transmission of an uplink resource grant (UL Grant) on the downlink subframe, the UL Grant including a first uplink resource index resource index corresponding to a first uplink subframe group in a first uplink subframe set, and the first uplink subframe set corresponding to the downlink subframe.

14. The apparatus of claim 13, wherein the executable instructions, when executed by the processor, cause the apparatus to:
    control reception of data on each of the at least one uplink subframe specified in the time domain in the uplink subframe group.

15. The apparatus of claim 13, wherein each uplink subframe group comprises an unique uplink subframe grouping by defining at least one uplink subframe different from one or more uplink subframes for other groups in the plurality of uplink subframe groups.

16. The apparatus of claim 13, wherein the uplink resource index is provided with a length of two bits.

17. An apparatus, comprising:
    a storage medium including executable instructions; and
    a processor;
    wherein the executable instructions, when executed by the processor, cause the apparatus to:
    control reception of an uplink resource grant (UL Grant) from a base station on a downlink subframe in a radio frame, each downlink subframe corresponding to an unique uplink subframe set having a plurality of uplink subframe groups, each uplink subframe group corresponding to an uplink resource index and is identified by the uplink resource index, each uplink subframe group having an unique uplink subframe grouping specifying at least one uplink subframe in a time domain, and at least one group in the plurality of uplink subframe groups comprising at least two uplink subframes;

identify the downlink subframe on which the UL Grant is received, the UL Grant including a first uplink resource index corresponding to a first uplink subframe group in a first uplink subframe set and identifying the first uplink subframe group, and the first uplink subframe set corresponding to the downlink subframe;

identify the first uplink subframe group identified by the first uplink resource index; and control transmission of data on each of at least one uplink subframes specified in the time domain in the first uplink subframe group.

18. The apparatus of claim 17 wherein each uplink subframe group comprises an unique uplink subframe grouping defining at least one uplink subframe different from at least one uplink subframe for other groups in the plurality of uplink subframe groups.

19. The apparatus of claim 18, wherein the uplink resource index is provided with a length of two bits.

* * * * *